United States Patent
Ponte et al.

(10) Patent No.: US 12,529,906 B2
(45) Date of Patent: Jan. 20, 2026

(54) ULTRATHIN EYEGLASSES

(71) Applicant: Thinoptics, Inc., San Jose, CA (US)

(72) Inventors: Gad Ponte, Palo Alto, CA (US);
Tadmor Shalon, Palo Alto, CA (US)

(73) Assignee: Thinoptics, Inc., San Jose, CA (US)

( * ) Notice: Subject to any disclaimer, the term of this patent is extended or adjusted under 35 U.S.C. 154(b) by 0 days.

(21) Appl. No.: 18/407,359

(22) Filed: Jan. 8, 2024

(65) Prior Publication Data

US 2024/0369853 A1 Nov. 7, 2024

Related U.S. Application Data

(63) Continuation of application No. 16/487,859, filed as application No. PCT/US2018/038786 on Jun. 21, 2018, now Pat. No. 11,899,282.

(51) Int. Cl.
*G02C 5/00* (2006.01)
*G02C 1/06* (2006.01)
*G02C 5/14* (2006.01)
*G02C 5/22* (2006.01)

(52) U.S. Cl.
CPC ............. *G02C 5/006* (2013.01); *G02C 1/06* (2013.01); *G02C 5/008* (2013.01); *G02C 5/14* (2013.01); *G02C 5/2209* (2013.01); *G02C 2200/08* (2013.01)

(58) Field of Classification Search
None
See application file for complete search history.

(56) References Cited

U.S. PATENT DOCUMENTS

| | | | |
|---|---|---|---|
| 232,493 A | 9/1880 | Hauck | |
| 261,799 A | 7/1882 | Woodward | |
| 272,450 A | 2/1883 | Manning | |
| 353,203 A | 11/1886 | Chase | |
| 368,852 A * | 8/1887 | Ramsay | G02C 5/00 403/113 |
| 380,491 A | 4/1888 | Kahn | |
| 470,029 A | 3/1892 | Wood | |
| 529,988 A | 11/1894 | Wood | |
| 541,767 A | 6/1895 | Lloyd | |
| 574,523 A | 1/1897 | Crauss | |

(Continued)

FOREIGN PATENT DOCUMENTS

CN 101711374 A 5/2010
CN 201597163 U 10/2010

(Continued)

OTHER PUBLICATIONS

Ponte et al.; U.S. Appl. No. 18/656,482 entitled "Foldable eyeglassess and case," filed May 6, 2024.

(Continued)

*Primary Examiner* — Darryl J Collins
(74) *Attorney, Agent, or Firm* — Thinoptics, Inc.

(57) ABSTRACT

Embodiments of eyeglasses are provided. The glasses comprise a frame comprising a first and second lens connected by a bridge. Temple pieces extend from either side of the frame. The hinge or hinge point between the temple pieces and the frame can be within the plane of the glasses allowing the temple pieces to fold flat or near flat against the frame. The thickness of the glasses can be less than about 3.5 mm (e.g., 2.6 mm) in a folded configuration.

19 Claims, 11 Drawing Sheets

(56) References Cited

U.S. PATENT DOCUMENTS

| | | |
|---|---|---|
| 585,619 A | 6/1897 | Cottet, Jr. |
| 677,996 A | 7/1901 | Kleinert |
| 683,417 A | 9/1901 | Weinstein |
| 942,480 A | 12/1909 | Bradshaw |
| 1,017,579 A | 2/1912 | Nicol |
| D49,217 S | 6/1916 | King |
| 1,363,689 A | 12/1920 | Styll |
| 1,892,642 A * | 12/1932 | Gaspari .................. G02C 5/08 351/63 |
| 1,915,707 A | 6/1933 | Henry |
| 1,919,262 A | 7/1933 | Shields |
| 1,919,938 A | 7/1933 | Fielding |
| 1,931,634 A | 10/1933 | Tanasso et al. |
| 1,970,044 A | 8/1934 | Klein |
| 2,004,445 A | 6/1935 | Meyer |
| 2,023,469 A | 12/1935 | Grier |
| 2,036,591 A | 4/1936 | Marciano |
| 2,047,646 A | 7/1936 | Nerney |
| 2,061,411 A | 11/1936 | Tanasso et al. |
| 2,187,177 A | 1/1940 | Schuz |
| 2,234,729 A | 3/1941 | Montalvo-Guenard |
| 2,301,182 A | 11/1942 | Kaser |
| 2,323,518 A | 7/1943 | Cochran |
| 2,478,921 A | 8/1949 | Hansen |
| 2,537,248 A | 1/1951 | Vigano |
| 2,719,565 A | 10/1955 | Wolff |
| 2,811,897 A | 11/1957 | Belgard |
| 2,975,426 A | 3/1961 | Rabb |
| 3,085,584 A | 4/1963 | Hollinger |
| 3,323,638 A | 6/1967 | Dishart |
| D209,016 S | 10/1967 | Weissman |
| 3,395,964 A | 8/1968 | Nieder |
| D220,597 S | 4/1971 | Dawson et al. |
| 4,018,515 A | 4/1977 | Derkas |
| D247,111 S | 1/1978 | Olivan |
| 4,255,024 A | 3/1981 | De Monts et al. |
| 4,577,942 A | 3/1986 | Frieder et al. |
| 4,600,279 A | 7/1986 | Tabacchi |
| D289,122 S | 4/1987 | Meyer et al. |
| 4,772,112 A | 9/1988 | Zider et al. |
| 4,780,928 A * | 11/1988 | De Lorenzo Poz . G02C 5/2209 16/257 |
| 4,840,476 A | 6/1989 | Rooney |
| D305,478 S | 1/1990 | Lahm et al. |
| 4,896,955 A | 1/1990 | Zider et al. |
| 4,924,245 A | 5/1990 | Dianitsch |
| 5,015,087 A | 5/1991 | Baratelli |
| D318,949 S | 8/1991 | Mawhinney et al. |
| D322,262 S | 12/1991 | Manus |
| D330,456 S | 10/1992 | Lehman |
| D343,402 S | 1/1994 | Scoppettone |
| 5,335,026 A | 8/1994 | Kato et al. |
| 5,369,451 A | 11/1994 | Tamagawa |
| 5,431,506 A | 7/1995 | Masunaga |
| 5,448,317 A | 9/1995 | Huang |
| 5,452,028 A | 9/1995 | Iijima |
| D363,603 S | 10/1995 | Leveen et al. |
| D371,679 S | 7/1996 | Nejman |
| D379,558 S | 6/1997 | Mischenko et al. |
| 5,646,707 A | 7/1997 | Arnette |
| 5,654,785 A | 8/1997 | Shih et al. |
| 5,748,280 A | 5/1998 | Herman |
| D397,551 S | 9/1998 | Shefler |
| D407,591 S | 4/1999 | Bolognia et al. |
| 5,929,966 A | 7/1999 | Conner |
| D414,036 S | 9/1999 | Conway |
| 5,949,515 A | 9/1999 | Hoshino |
| D418,857 S | 1/2000 | Paulsen et al. |
| 6,017,119 A | 1/2000 | Huang |
| 6,026,950 A | 2/2000 | Wisniewski |
| D421,526 S | 3/2000 | Isaacson |
| 6,053,309 A | 4/2000 | Lin |
| 6,077,368 A | 6/2000 | Nakamura et al. |
| D428,253 S | 7/2000 | Huang |
| D430,393 S | 9/2000 | Conway |
| D430,727 S | 9/2000 | Wisniewski |
| D435,340 S | 12/2000 | Kojoori |
| 6,158,860 A | 12/2000 | Huang |
| D436,613 S | 1/2001 | Chao |
| D438,904 S | 3/2001 | Reynolds |
| 6,210,004 B1 | 4/2001 | Horikawa et al. |
| 6,264,326 B1 | 7/2001 | Hyoi |
| D446,237 S | 8/2001 | Koevari |
| D451,119 S | 11/2001 | Koevari |
| D451,674 S | 12/2001 | Leins |
| 6,357,873 B1 | 3/2002 | Spindelbalker |
| 6,371,614 B1 | 4/2002 | Herman |
| 6,530,659 B1 | 3/2003 | Marcum |
| 6,530,660 B1 | 3/2003 | Chao et al. |
| 6,641,260 B1 | 11/2003 | Avital |
| 6,773,106 B2 | 8/2004 | Herman |
| 6,814,226 B2 | 11/2004 | Chao |
| 6,826,801 B1 * | 12/2004 | Fuchs .................. G02C 5/2209 16/228 |
| D503,087 S | 3/2005 | Dzwill et al. |
| D507,871 S | 8/2005 | DiMarchi et al. |
| D515,805 S | 2/2006 | Jones |
| D518,636 S | 4/2006 | Sievers |
| D527,891 S | 9/2006 | Hoeksema |
| 7,117,990 B2 | 10/2006 | Sharif |
| 7,287,851 B2 | 10/2007 | Amioka |
| D555,900 S | 11/2007 | Pippin |
| 7,338,157 B1 * | 3/2008 | Leung .................. G02C 5/2209 351/153 |
| 7,452,070 B2 | 11/2008 | Oskarsson |
| D585,471 S | 1/2009 | Thompson |
| 7,484,843 B1 | 2/2009 | Lin |
| 7,637,610 B2 | 12/2009 | Graffia |
| 7,748,843 B2 | 7/2010 | Stewart |
| D631,246 S | 1/2011 | Boettner |
| 7,905,591 B2 | 3/2011 | Strobel |
| D651,799 S | 1/2012 | Dial |
| D653,656 S | 2/2012 | Charnas et al. |
| D669,082 S | 10/2012 | Sato |
| D684,367 S | 6/2013 | Phillips et al. |
| D687,376 S | 8/2013 | Farris-Gilbert et al. |
| D692,236 S | 10/2013 | Ashkenazy |
| D703,198 S | 4/2014 | Simmer |
| D703,722 S | 4/2014 | Kim et al. |
| D712,144 S | 9/2014 | Albanese |
| D713,145 S | 9/2014 | Fathollahi |
| D714,058 S | 9/2014 | Owen |
| D714,550 S | 10/2014 | Yoo |
| D715,052 S | 10/2014 | Fair |
| D716,045 S | 10/2014 | Requa |
| D716,049 S | 10/2014 | Fair |
| D719,950 S | 12/2014 | Smith et al. |
| D721,493 S | 1/2015 | Godshaw et al. |
| D724,833 S | 3/2015 | Schneider et al. |
| D724,834 S | 3/2015 | Schneider et al. |
| D726,246 S | 4/2015 | Shalon |
| D726,413 S | 4/2015 | Shalon |
| D731,178 S | 6/2015 | Gorouvein et al. |
| 9,069,189 B2 | 6/2015 | Shalon |
| 9,081,209 B2 | 7/2015 | Shalon |
| 9,140,909 B2 | 9/2015 | Daole |
| D740,018 S | 10/2015 | Zhang et al. |
| 9,158,125 B2 | 10/2015 | Shalon |
| 9,379,759 B2 | 6/2016 | Platt |
| 9,408,446 B2 | 8/2016 | Liebers et al. |
| D765,975 S | 9/2016 | Hoofnagle et al. |
| 9,581,830 B2 | 2/2017 | Porter |
| 9,645,410 B2 | 5/2017 | Barnett et al. |
| 9,696,756 B1 | 7/2017 | Olsson et al. |
| 9,726,902 B2 | 8/2017 | Shalon |
| D805,298 S | 12/2017 | Shalon |
| D809,292 S | 2/2018 | Mason |
| D810,431 S | 2/2018 | Kim et al. |
| D822,996 S | 7/2018 | Ehara et al. |
| 10,259,021 B2 | 4/2019 | Mayfield et al. |
| D877,493 S | 3/2020 | Zhang |
| 10,703,297 B1 | 7/2020 | Cohen et al. |
| D921,980 S | 6/2021 | Xu et al. |
| 11,042,043 B1 | 6/2021 | Ginocchio |

(56) References Cited

U.S. PATENT DOCUMENTS

| | | |
|---|---|---|
| D927,850 S | 8/2021 | May et al. |
| D928,501 S | 8/2021 | McManigal et al. |
| D930,898 S | 9/2021 | Choe |
| D930,983 S | 9/2021 | Ryan |
| D946,263 S | 3/2022 | Albay et al. |
| D949,550 S | 4/2022 | Ramm et al. |
| D952,343 S | 5/2022 | Liang |
| D972,295 S | 12/2022 | Rasier et al. |
| D972,299 S | 12/2022 | Zhou |
| D972,300 S | 12/2022 | Zhou |
| 11,538,189 B1 | 12/2022 | Sztuk et al. |
| 11,579,467 B2 | 2/2023 | Shalon et al. |
| D984,283 S | 4/2023 | Dellamonica |
| 11,899,282 B2 | 2/2024 | Ponte et al. |
| 2001/0028431 A1 | 10/2001 | Rossin |
| 2001/0055093 A1 | 12/2001 | Saitoh et al. |
| 2002/0096439 A1 | 7/2002 | Lin |
| 2003/0025871 A1 | 2/2003 | Masunaga |
| 2005/0078274 A1 | 4/2005 | Howell et al. |
| 2005/0155872 A1 | 7/2005 | Cheng |
| 2008/0013036 A1* | 1/2008 | Daems ............... G02C 5/00 351/41 |
| 2008/0083627 A1 | 4/2008 | Hamm |
| 2008/0204652 A1* | 8/2008 | Spandl ............... G02C 5/008 351/153 |
| 2008/0218683 A1 | 9/2008 | Lam et al. |
| 2008/0231800 A1 | 9/2008 | Esser et al. |
| 2009/0033862 A1 | 2/2009 | Margolis |
| 2009/0051868 A1 | 2/2009 | Kwan |
| 2009/0310080 A1 | 12/2009 | Dellapina |
| 2010/0073625 A1 | 3/2010 | Engstrom |
| 2010/0073626 A1 | 3/2010 | Engstrom |
| 2010/0294675 A1 | 11/2010 | Mangano |
| 2011/0192857 A1 | 8/2011 | Rothbaum et al. |
| 2011/0205483 A1 | 8/2011 | Margolis |
| 2011/0210018 A1 | 9/2011 | Friedman et al. |
| 2011/0228210 A1 | 9/2011 | Willett |
| 2012/0140163 A1 | 6/2012 | Hogan |
| 2012/0218506 A1 | 8/2012 | Perez |
| 2012/0293766 A1 | 11/2012 | Pitcairn |
| 2012/0327360 A1 | 12/2012 | Lin |
| 2014/0268005 A1 | 9/2014 | Pluta |
| 2014/0317886 A1 | 10/2014 | Shwartz |
| 2014/0360898 A1 | 12/2014 | Kantor et al. |
| 2015/0061166 A1 | 3/2015 | Van De Vrie et al. |
| 2016/0016370 A1 | 1/2016 | Sheldon et al. |
| 2016/0018670 A1 | 1/2016 | Lando et al. |
| 2016/0077356 A1 | 3/2016 | Allen |
| 2016/0077358 A1 | 3/2016 | Bischoff |
| 2016/0116761 A1 | 4/2016 | Sbardella |
| 2016/0320632 A1 | 11/2016 | Paulet Vazquez |
| 2017/0255229 A1 | 9/2017 | Buckley |
| 2017/0264725 A1 | 9/2017 | Holder |
| 2017/0299885 A1 | 10/2017 | Shalon |
| 2017/0322428 A1 | 11/2017 | Da Col |
| 2018/0348541 A1 | 12/2018 | Radzwill |
| 2019/0072780 A1 | 3/2019 | Balzan et al. |
| 2019/0353923 A1* | 11/2019 | Ricart Gisbert ......... G02C 1/08 |
| 2020/0012122 A1 | 1/2020 | Johnson et al. |
| 2021/0080748 A1 | 3/2021 | Ponte et al. |
| 2021/0231971 A1* | 7/2021 | Artusi ............... G02C 5/146 |
| 2023/0093500 A1 | 3/2023 | Ponte |
| 2024/0027789 A1 | 1/2024 | Shalon et al. |

FOREIGN PATENT DOCUMENTS

| | | |
|---|---|---|
| CN | 201600509 U | 10/2010 |
| CN | 202815334 U | 3/2013 |
| CN | 203365820 U | 12/2013 |
| CN | 204409884 U | 6/2015 |
| CN | 205080322 U | 3/2016 |
| CN | 107290866 A | 10/2017 |
| CN | 206791908 U | 12/2017 |
| CN | 208243108 U | 12/2018 |
| CN | 305784014 | 5/2020 |
| CN | 305863764 | 6/2020 |
| CN | 305969874 | 8/2020 |
| CN | 306887805 | 10/2021 |
| DE | 431225 C1 | 12/1993 |
| DE | 4407313 A1 | 9/1995 |
| DE | 102013007173 A1 | 10/2014 |
| EP | 1876488 A1 | 1/2008 |
| EP | 2016457 B1 | 6/2011 |
| GB | 328584 A | 4/1930 |
| IT | PD20110202 A1 | 12/2012 |
| IT | UD20110080 A1 | 12/2012 |
| JP | S51-16057 U | 2/1976 |
| JP | S58-175511 U | 11/1983 |
| JP | H01-64616 U | 4/1989 |
| JP | H04-26755 A | 1/1992 |
| JP | H08-146357 A | 6/1996 |
| JP | 2014213120 A | 11/2014 |
| KR | 2020130002469 U | 4/2013 |
| KR | 20140001657 U | 3/2014 |
| KR | 1020160046503 A | 4/2016 |
| WO | WO2006/114837 A1 | 11/2005 |
| WO | WVO2010/086650 A1 | 8/2010 |
| WO | WO2011/068051 A1 | 4/2013 |
| WO | WO2014/133352 A1 | 9/2014 |

OTHER PUBLICATIONS

Google; Parasite eyewear; 3 pages; retrieved from the internet (https://www.google.com/search?q=parasite+eyewear&client=safari v ed=0ahUKEwiipJC_4JPWAhXoyFQKHZ3HD-wQ_AUICygC&biw=1416&bih=789) on Sep. 7, 2017.

Kickstarter; Roav—World's thinnest folding sunglasses; 14 pages; retrieved from the internet (https://www.kickstarter.com/projects/653457680/roav-anywhere-eyewear) on Jan. 8, 2019.

Pince-Nez; www.en.wikipedia.org/wiki/Pince-nez; pp. 1-4; printed Sep. 20, 2013.

Thinoptics; Glasses and Keychain case; 4 pages; retrieved from the internet (https://www.thinoptics.com/keychain-case-glasses) on Jan. 8, 2019.

Vimeo; FlashCard-Video; (Screenshot); 2 pages; retrieved from the internet (https://vimeo.com/266171301); on Apr. 23, 2018.

Wikipedia; Circular segment; 3 pages; retrieved from the internet (https://en.wikipedia.org/wiki/Circular_segment) on Jan. 8, 2019.

Ponte et al.; U.S. Appl. No. 29/743,439 entitled "Eyeglasses case," filed Jul. 21, 2020.

* cited by examiner

ULTRATHIN EYEGLASSES

CLAIM OF PRIORITY

This application is a continuation of U.S. application Ser. No. 16/487,859, filed Aug. 22, 2019, titled "ULTRATHIN EYEGLASSES", which is a 371 of International Application No. PCT/US2018/038786, filed Jun. 21, 2018, titled "ULTRATHIN EYEGLASSES", the entire disclosures of which are incorporated by reference herein for all purposes.

CROSS REFERENCE TO RELATED APPLICATIONS

This application may be related to U.S. Provisional Patent Application No. 62/559,419, filed Sep. 15, 2017, the entire disclosure of which is incorporated by reference herein.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This application relates to the field of eyewear.

BACKGROUND

Eyewear and in particular, glasses that are used episodically (e.g., sun glasses, reading glasses and safety glasses), benefit from a thin design, allowing convenient carrying of the glasses. Such glasses can also be used with a compact, convenient carrying case that attaches to key chains, smart phones, clothing or can be placed in pockets or purses. The present application provides a convenient way to create ultrathin glasses that can be inserted folded into a carrying case not much bigger than the thickness of the eyeglasses frame.

SUMMARY OF THE DISCLOSURE

In one aspect of the current invention, an embodiment of eyeglasses is provided. The eyeglasses comprise a frame comprising a first lens and a second lens connected by a nosebridge; a first temple piece extending from a first end of the frame and configured to fold down, the first temple piece configured to fold against the frame in a folded configuration; a second temple piece extending from a second end of the frame, the second temple piece configured to fold against the frame in a folded configuration; a first hinge connecting the first temple piece to the first end of the frame; a second hinge connecting the second temple piece to the second end of the frame, wherein a thickness of the eyeglasses in the folded configuration is no more than 3.5 mm.

In some embodiments, the first hinge comprises a hinge point that is contained within a plane of the frame and lenses. The second hinge can comprise a hinge point that is contained within a plane of the frame and lenses. In some embodiments, the first hinge is contained within a plane of the frame and lenses. The second hinge can be is contained within a plane of the frame and lenses. In some embodiments, at least one of the first lens and the second lens is an aspherical lens comprising high index material. Additional lens material can be added to an edge of the lens to extend the aspherical lens to the frame. In some embodiments, the index of the lens is about 1.5-1.75. Other indices are also possible. In some embodiments, an eyewear system comprising the glasses and a case comprising a thickness of about 4.5 mm. is provided. In some embodiments, at least one of the first hinge and the second hinge comprises an overmolded, undulating insert for connecting to the frame. At least one of the first hinge and the second hinge can comprise an overmolded sinusoidal-shaped insert for connecting to the frame. In some embodiments, at least one of the first hinge and the second hinge comprises an overmolded zig-zag shaped insert for connecting to the corresponding hinge. The overmolded insert can comprise a plastic overmolding. In some embodiments, the thickness of the eyeglasses in the folded configuration is about 3.2 mm. In some embodiments, the thickness of the eyeglasses in the folded configuration is about 2.6 mm. At least one of the first lens and the second lens can comprise a high index, aspherical lens. The frame can comprise polycarbonate. In some embodiments, at least one of the first hinge and the second hinge comprises polycarbonate. At least a portion of the first hinge and the second hinge can be integrally formed with the frame. In some embodiments, at least a portion of the first hinge and the second hinge are formed separately and attached to the frame. At least one of the first temple piece and the second temple piece can comprise a metal. In some embodiments, at least one of the first temple piece and the second temple piece comprises nitinol. At least one of the first temple piece and the second temple piece can be plated or painted to match a color or design of the frame. The frame can comprise a color or design. In some embodiments, the hinge comprises a loop formed at an end of at least one of the first temple piece and the second temple piece and a pocket formed on an edge of the frame, the loop configured to be inserted into the pocket. The glasses can comprise a pin inserted through the pocket and the loop, the loop configured to rotate about the pin. In some embodiments, the glasses comprise a bearing configured to be inserted within the loop.

In another aspect, a method of manufacturing eyeglasses is provided. The method comprises providing a frame comprising a first lens and a second lens connected by a nosebridge; providing a first temple piece extending from a first end of the frame and configured to fold down, the first temple piece configured to fold against the frame in a folded configuration; providing a second temple piece extending from a second end of the frame, the second temple piece configured to fold against the frame in a folded configuration; providing a first hinge connecting the first temple piece to the first end of the frame; providing a second hinge connecting the second temple piece to the second end of the frame, wherein a thickness of the eyeglasses in the folded configuration is no more than 3.5 mm.

In some embodiments, the method comprises UV printing the frame to apply a color or pattern. The method can comprise plating at least one of the first and second temple pieces to apply a color or design. In some embodiments, the method comprises applying soft touch paint to at least one of the first and second temple pieces to apply a color or design. At least one of the lenses can be an aspherical lens comprising a high index material. The lens can have an index of about 1.5-1.75. Other indices are also possible. In some embodiments, providing the frame comprises adding additional material to an edge of the aspherical lens to extend it to reach the frame. Providing the frame can comprise adding additional material to an edge of the aspherical lens to thicken the edge of the aspherical lens.

In another aspect, an embodiment of eyeglasses is provided. The eyeglasses comprise a frame comprising a first lens and a second lens connected by a nosebridge, wherein at least one of the two lenses is an aspherical lens comprising a high index material, an edge of the aspherical lens comprising additional material to extend the aspherical lens to reach an edge of the lens opening; a first temple piece extending from a first end of the frame and configured to fold down, the first temple piece configured to fold against the frame in a folded configuration; a second temple piece extending from a second end of the frame, the second temple piece configured to fold against the frame in a folded configuration; a first hinge connecting the first temple piece to the first end of the frame; and a second hinge connecting the second temple piece to the second end of the frame.

In some embodiments, the index of the aspherical lens is about 1.5-1.75. Other indices are also possible. The thickness of the glasses in the folded configuration can be no more than about 3.5 mm. The thickness of the frame can be about 2 mm. The frame can comprise a polymer. The frame can be rigid. The frame can comprise polycarbonate. In some embodiments, the first hinge comprises a hinge point that is contained within a plane of the frame and lenses. The second hinge can comprise a hinge point that is contained within a plane of the frame and lenses. In some embodiments, the first hinge is contained within a plane of the frame and lenses. The second hinge can be contained within a plane of the frame and lenses. In some embodiments, an eyewear system comprising the glasses and a case comprising a thickness of about 4.35-4.5 mm is provided. In some embodiments, at least one of the first hinge and the second hinge comprises an overmolded, undulating insert for connecting to the frame. At least one of the first hinge and the second hinge can comprise an overmolded sinusoidal-shaped insert for connecting to the frame. In some embodiments, at least one of the first hinge and the second hinge comprises an overmolded zig-zag shaped insert for connecting to the frame. The overmolded insert can comprise a plastic fillet. In some embodiments, the thickness of the eyeglasses in the folded configuration is about 3.2 mm. The thickness of the eyeglasses in the folded configuration can be about 2.6 mm. In some embodiments, both the first lens and the second lens comprises a high index, aspherical lens. The frame can comprise polycarbonate. In some embodiments, at least one of the first hinge and the second hinge comprises polycarbonate. The first hinge and the second hinge can be integrally formed with the frame. In some embodiments, the first hinge and the second hinge are formed separately and attached to the frame. At least one of the first temple piece and the second temple piece can comprise nitinol. In some embodiments, at least one of the first temple piece and the second temple piece is plated or painted to match a color or design of the frame. The frame can comprise a color or design. In some embodiments, the hinge comprises a loop formed at an end of at least one of the first temple piece and the second temple piece and a pocket formed on an edge of the frame, the loop configured to be inserted into the pocket. The glasses and hinge can comprise a pin inserted through the pocket and the loop, the loop configured to rotate about the pin. The glasses and hinge can comprise a bearing configured to be inserted within the loop.

In yet another aspect, a method of manufacturing glasses is provided. The method comprises providing a frame comprising two lens openings connected by a nosebridge; providing two lenses disposed in the lens openings, wherein at least one of the lenses is an aspherical lens comprising a high index material; adding extra material to an edge of the aspherical lens to thicken the edge of the lens and strengthen the connection between the lens and the lens opening; providing a first temple piece extending from a first end of the frame and configured to fold down, the first temple piece configured to fold against the frame in a folded configuration; providing a second temple piece extending from a second end of the frame, the second temple piece configured to fold against the frame in a folded configuration; providing a first hinge connecting the first temple piece to the first end of the frame; and providing a second hinge connecting the second temple piece to the second end of the frame.

In some embodiments, the method comprises UV printing the frame to apply a color or pattern. The method can comprise plating at least one of the first and second temple pieces to apply a color or design. In some embodiments, the method comprises applying soft touch paint to at least one of the first and second temple pieces to apply a color or design. Adding extra material to the edge of the aspherical lens can extend the lens to reach an edge of the lens opening.

In another aspect, an embodiment of eyeglasses is provided. The eyeglasses comprise a frame comprising a first lens and a second lens connected by a nosebridge, the frame comprising a first pocket formed in a first end of the frame and a second pocket formed in a second end of the frame; a first temple piece extending from the first end of the frame and configured to fold down, the first temple piece configured to fold against the frame in a folded configuration, the first temple piece comprising a first loop formed at an end of the temple piece, the first loop configured to be inserted into the first pocket on the frame; and a second temple piece extending from the second end of the frame, the second temple piece configured to fold against the frame in a folded configuration, the second temple piece comprising a second loop formed at an end of the temple piece, the second loop configured to be inserted into the second pocket on the frame. The glasses can comprise a bearing configured to be inserted in the first and second loop. The glasses can comprise a first pin configured to be inserted through the first pocket and the first loop and a second pin configured to be inserted through the second pocket and the second loop.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
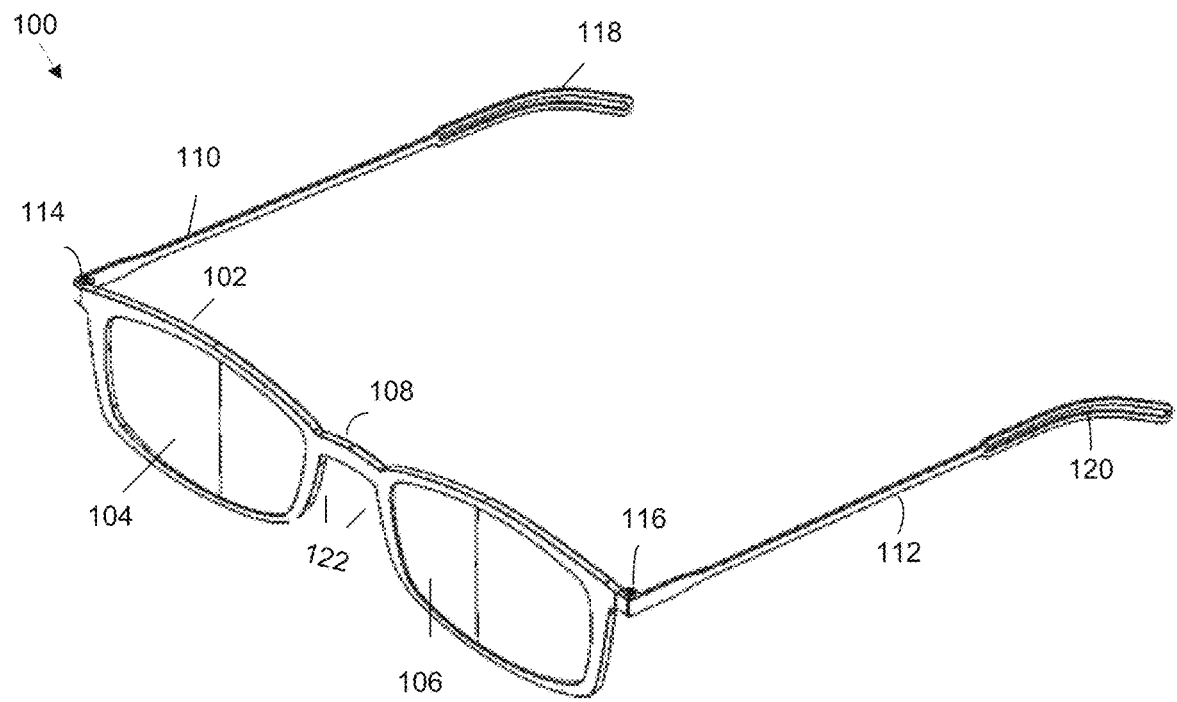
FIGS. 1A-1D illustrate an embodiment of eyeglasses.
Figure 1B:
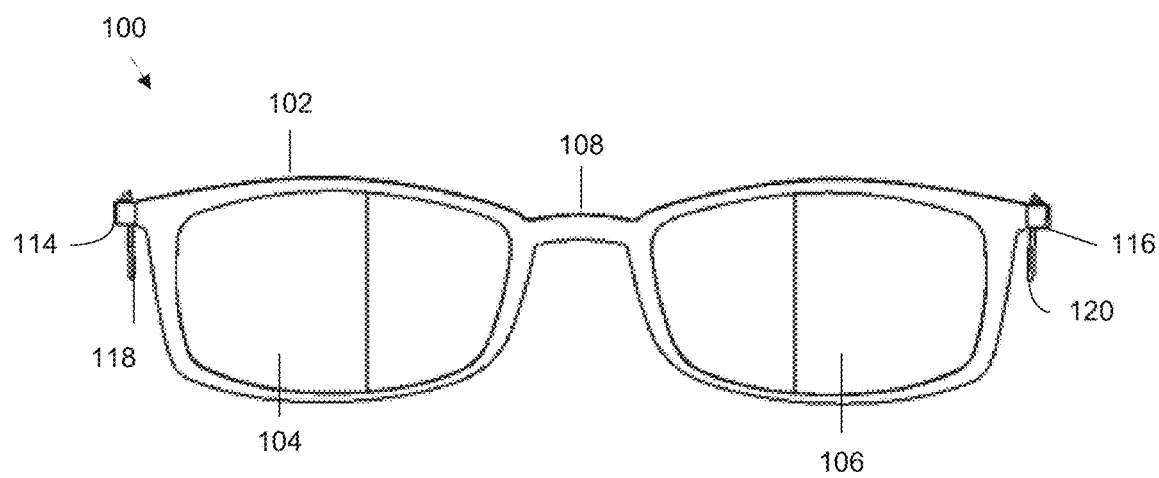

Embodiments of ultrathin eyeglasses are provided herein. The eyeglasses comprise a thin frame comprising two lenses connected by a nosebridge. A temple piece extends from each end of the frame. The temple pieces can be configured to fold flat or near flat against the frame and lenses such that there is little or no space between the temple piece and the frame in the folded configuration. The frame can comprise a plastic or polymer material and can be entirely molded from such a material. This design can allow for a frame with a very thin profile, for example less than 3.5 mm, enabling users to easily carry the glasses on a phone, in a purse, in a pocket, etc.

Currently available thin profile glasses generally do not comprise traditional temple pieces that are configured to fold flat or near flat against the frame. Such temple pieces can both provide stability to the user as well as provide a desired aesthetic affect. The enhanced stability enables the glasses to be worn during performance of numerous activities, not only limited to reading. The desired aesthetic affect can be due to the temple pieces resembling traditional, in-style temple piece design. Paper Glass, manufactured by Masahiro Sawada, utilizes curved temple pieces configured to fold above, instead of against, the lenses. While this produces a thin pair of glasses, the glasses do not have a traditional design, and may not appeal to as many users for that reason.

FIGS. 1A-D illustrate various views of an embodiment of eyeglasses 100. As shown in the top perspective view of 1A, and the front view of FIG. 1B, the eyeglasses 100 comprise a frame 102. The frame 102 comprises a first lens 104 and a second lens 106. The lenses 104, 106 are connected by a nosebridge 108. A first temple piece 110 extends from a first side of the frame 102, next to the first lens 104. A second temple piece 112 extends from a second side of the frame 102, next to the second lens 106. The first temple piece 110 is connected to the frame 102 using hinge 114. The second temple piece 112 is connected to the frame 102 using hinge 116. Either or both temple pieces can comprise a temple tip portion 118, 120.

In some embodiments, the frame comprises a polymer, such as polycarbonate. Other materials are also possible (e.g., Acetate, TR90, ULTEM, etc.). Such a material provides an aesthetic advantage as it can be used to create in-style designs, resembling glasses made of more traditional materials and still maintain a very thin profile. Such a material also provides the advantage of being able to be colored or patterned in a variety of styles. The color or pattern can be added using UV printing, which can provide the advantage of allowing a wide variety of styles to be produced economically. In some embodiments, a hardcoating process is used to make the lenses scratch resistant. Other coatings are also possible. For example, an anti-reflective coating and anti finger print coating can be applied as well. The frame can comprise a rigid material (e.g., the frame cannot be bent).

The lenses can comprise polycarbonate. In some embodiments, the lenses 104, 106 can be formed integrally with the frame 102. For example, the lenses and the frame can be molded as one solid piece (e.g., one solid piece of polycarbonate). In some embodiments, the lenses 104, 106 can be formed separately from the frame 102 and later attached to the frame.

In some embodiments, the nosebridge 108 comprises the same material as the rest of the frame (e.g., polycarbonate). In some embodiments, the bridge 108 can comprise a different material (e.g., nitinol). A combination of the bridge 108 and a portion 122 of the frame can be used to provide a comfortable fit on the nose without the use of any nose pads. In some embodiments, separate nose pads can be used to increase the friction with the nose on the edge of the frame that is in contact with the nose. Materials such as low durometer elastomers, grit embedded strip, micro texture on the frame can be used to increase the friction between the glasses and the nose. In some embodiments, micro texture is added by molding small serrations directly into the frame.

The hinges 114, 116 can comprise hinge points that are within the plane of the frame 102. This positioning can allow the temple pieces 110, 112 to lay flat against the frame 102 when in a folded configuration. In some embodiments, the frame 102 comprises the hinges 114, 112. Other configurations are also possible. In some embodiments, the entire hinge 114, 116 is within the plane of the frame 102 (e.g., as shown in FIGS. 6A-6D). In some embodiments, a portion of the hinges 114, 116 is formed integrally with the frame 102. In some embodiments, a portion of the hinges 114, 116 can be formed separately and attached to the frame 102.

In some embodiments, the temple pieces comprise a metal (e.g., nitinol). The temple pieces can be configured to fold flat against the frame. In some embodiments, the temple pieces are configured to fold near flat against the frame.

Figure 3A:
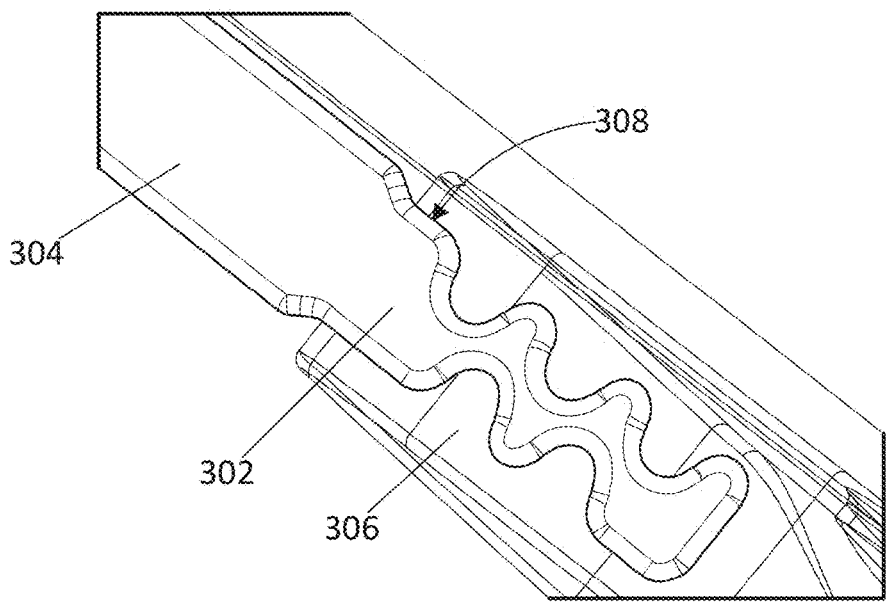
FIGS. 3A-3C depicts an embodiment of a temple piece insert for connecting to a hinge.
Figure 3B:
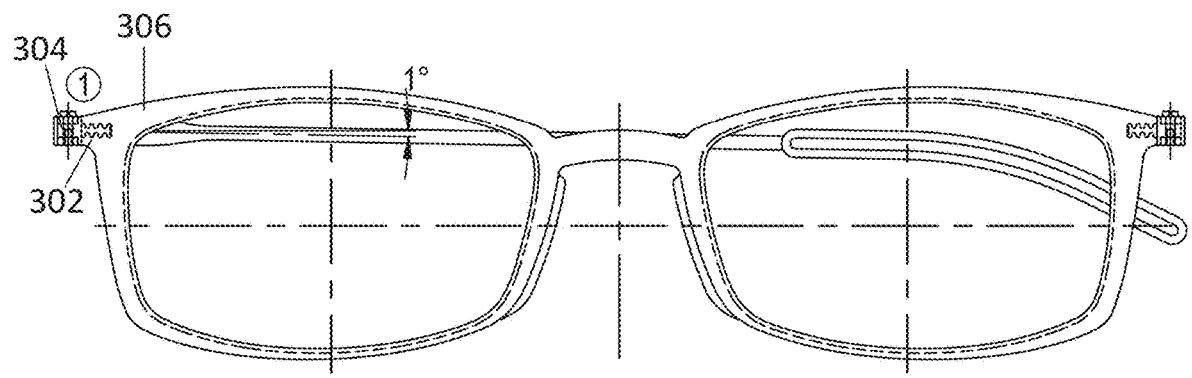
Figure 3C:
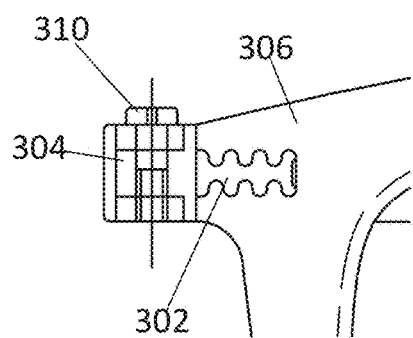

The hinges 114, 116 can comprise overmolded, curved inserts to increase the strength of the connection between the frame 102 and the hinges 114, 116. FIGS. 3A-3C depicts an embodiment of an insert 302 used to connect the frame 304 to the hinge 306 or strengthen the connection between the frame and the hinge. FIG. 3A provides a magnified view of the insert 302, while FIG. 3B shows the insert positioned in the glasses 100. The insert can comprise a metal (e.g., stainless steel) in some embodiments. The design of the overmolded metal insert piece of the hinge ensures a very high pull-out force without compromising on the durability of the molded material (e.g., polycarbonate). The wavy design and the rounded corners all serve to reduce stress concentration that might lead to stress cracking of the overmolded plastic material. The curved portion of the insert can comprise an undulating shape. In some embodiments, the insert comprises a sinusoidal or a zig-zag shape. The insert 302 can comprise a fillet 308, as shown in the magnified view of FIG. 3A. The length of the insert can be about 3.5 mm (or about 3 mm, about 4 mm, about 3-3.5 mm, about 3-4 mm, about 2-4 mm about 3-5 mm, etc.). The width of the insert can be about 1.5 mm (or about 1 mm, about 2 mm, about 1-2 mm, etc.). As noted above, the strength of the connection between the hinge and the frame can provide a high pull out force than can enable the temple piece to exert sufficient pressure to keep the glasses 100 properly positioned on a user's face while still allowing the glasses 100 to maintain a very thin profile. In some embodiments, the force exerted by the temple pieces can be sufficient to maintain the glasses in a stable position of the user's face. Other embodiments are also possible. For example, the hinges can comprise differently shaped inserts (e.g., straight inserts) or be connected to the frame in a different manner.

The temple piece can be attached to the hinge using screw 310, as shown in the blown up view of FIG. 3C. Other configurations are also possible (e.g., press fit pin).

Figure 1C:
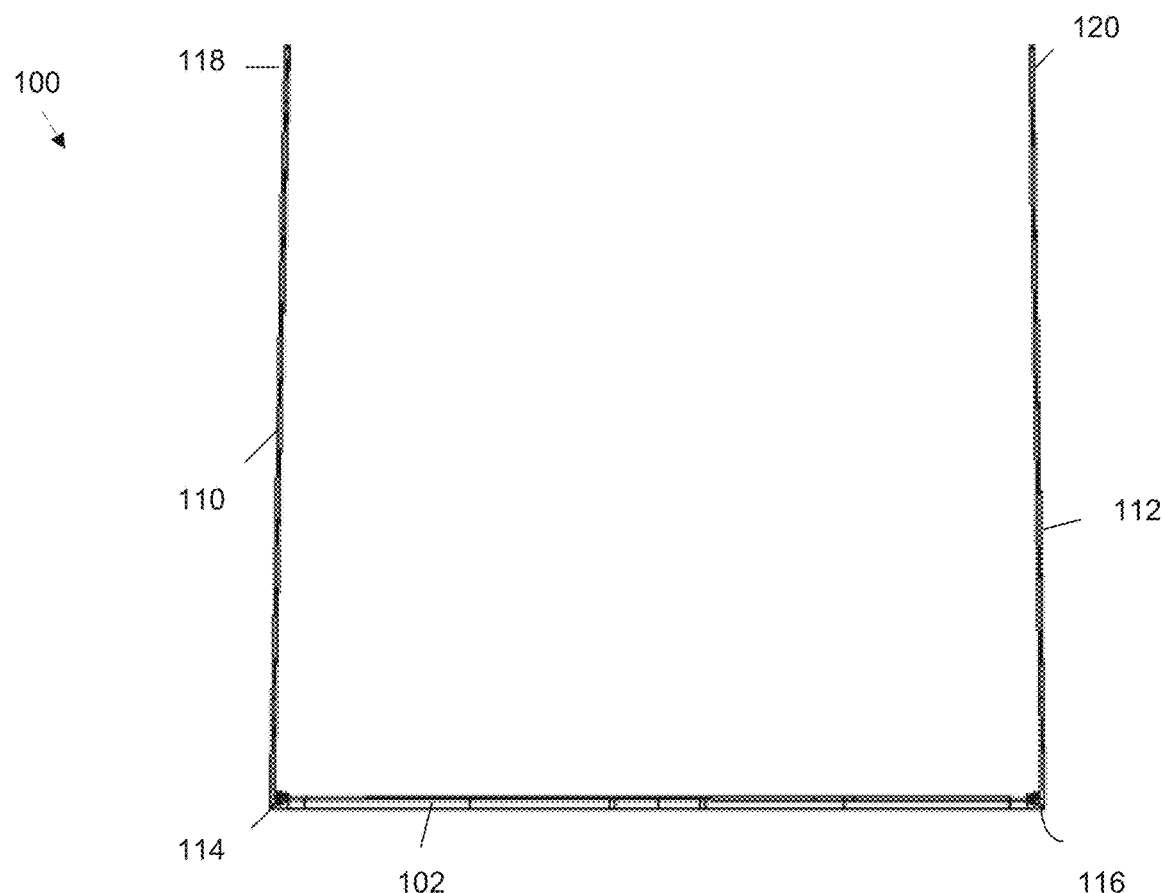
Figure 1D:
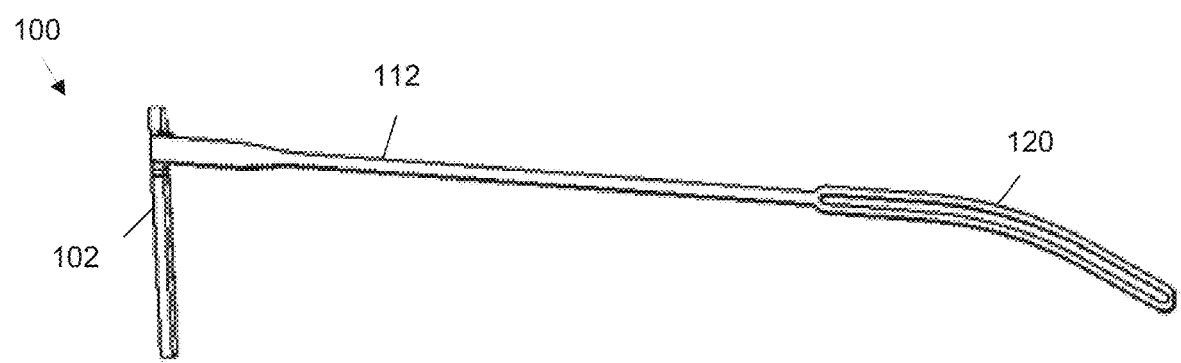

In some embodiments, the temple pieces 114, 116 comprise temple tips 118, 120, shown in FIGS. 1A, and the side view of FIG. 1D. The temple tips 118, 120 can comprise a larger surface area than other portions of the temple piece, as shown in FIG. 1D. This larger surface area can help distribute some of the pressure exerted by the temple piece on a user's head. The temple tips 118, 120 can comprise a same material as the temple pieces 114, 116. In some embodiments, the temple tips 118, 120 comprise a different material from the temple pieces 114, 116. For example, the temple tips can comprise low durometer elastomers or thermos plastics. Materials like silicone or soft touch paint can be used to increase friction between the temple tips and the head and to match the color of the temple tips 118, 120 to the temple piece 114, 116.

FIGS. 2A-2D illustrate various views of another embodiment of eyeglasses 200.

Unless otherwise described, features of the glasses 200 can be the same as those features of glasses 200 shown in FIGS. 2A-2D. As shown in the top perspective view of 2A, and the front view of FIG. 2B, the eyeglasses 200 comprise a frame 202. The frame 202 comprises a first lens 204 and a second lens 206. The lenses 204, 206 are connected by a nosebridge 208. A first temple piece 210 extends from a first side of the frame 202, next to the first lens 204. A second temple piece 212 extends from a second side of the frame 202, next to the second lens 206. The first temple piece 210 is connected to the frame 202 using hinge 214. The second temple piece 212 is connected to the frame 202 using hinge 216. Either or both temple pieces can comprise a temple tip portion 218, 220, best shown in the side view of FIG. 2D.

Figure 2A:
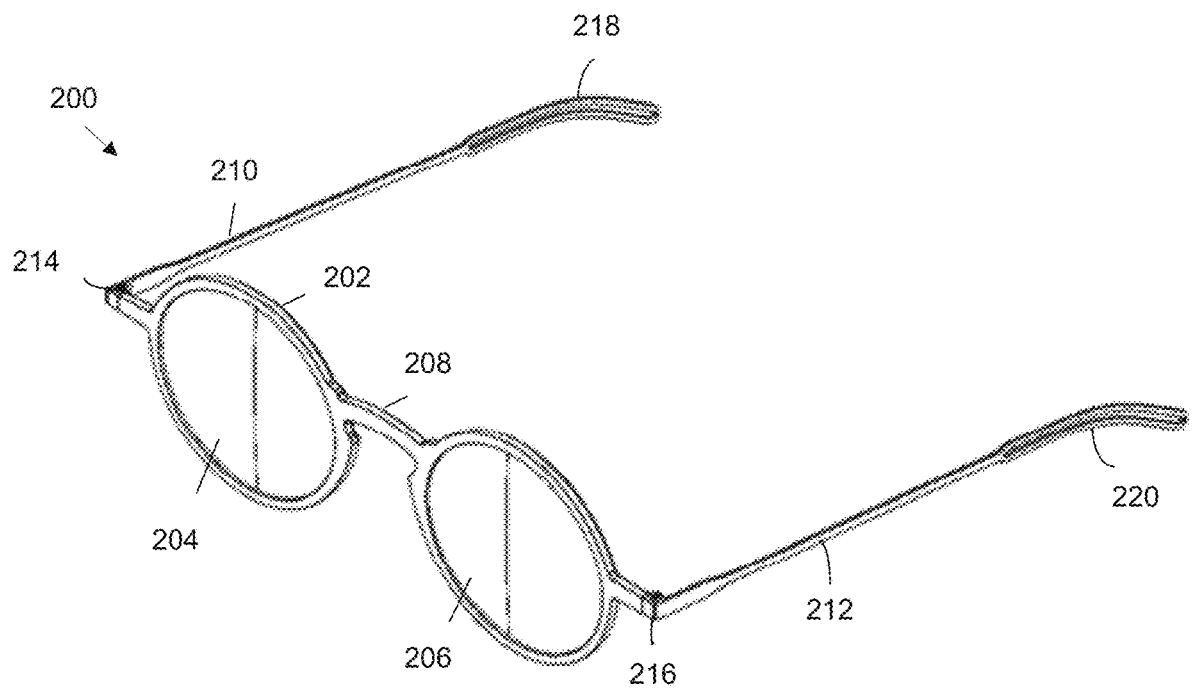
FIGS. 2A-2F show another embodiment of eyeglasses.
Figure 2B:
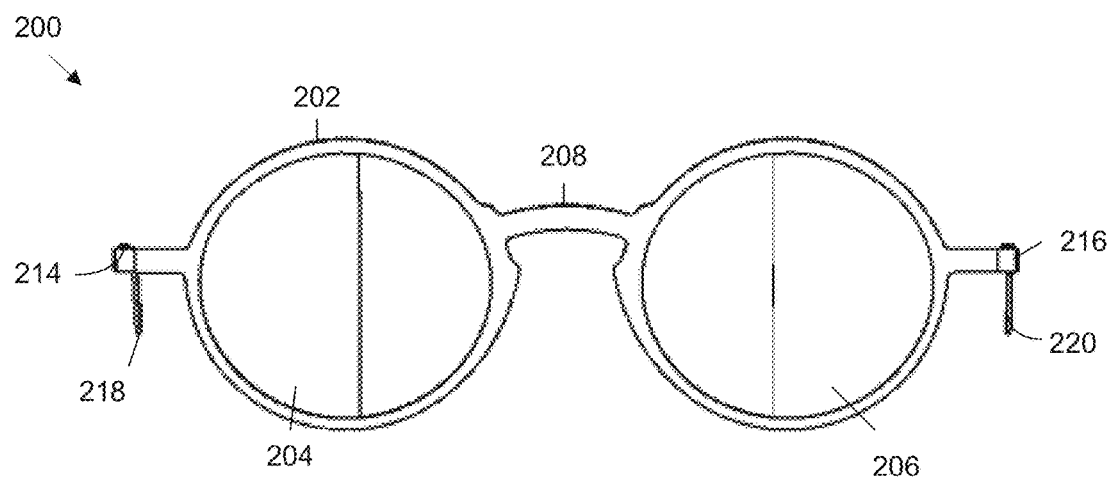
Figure 2C:
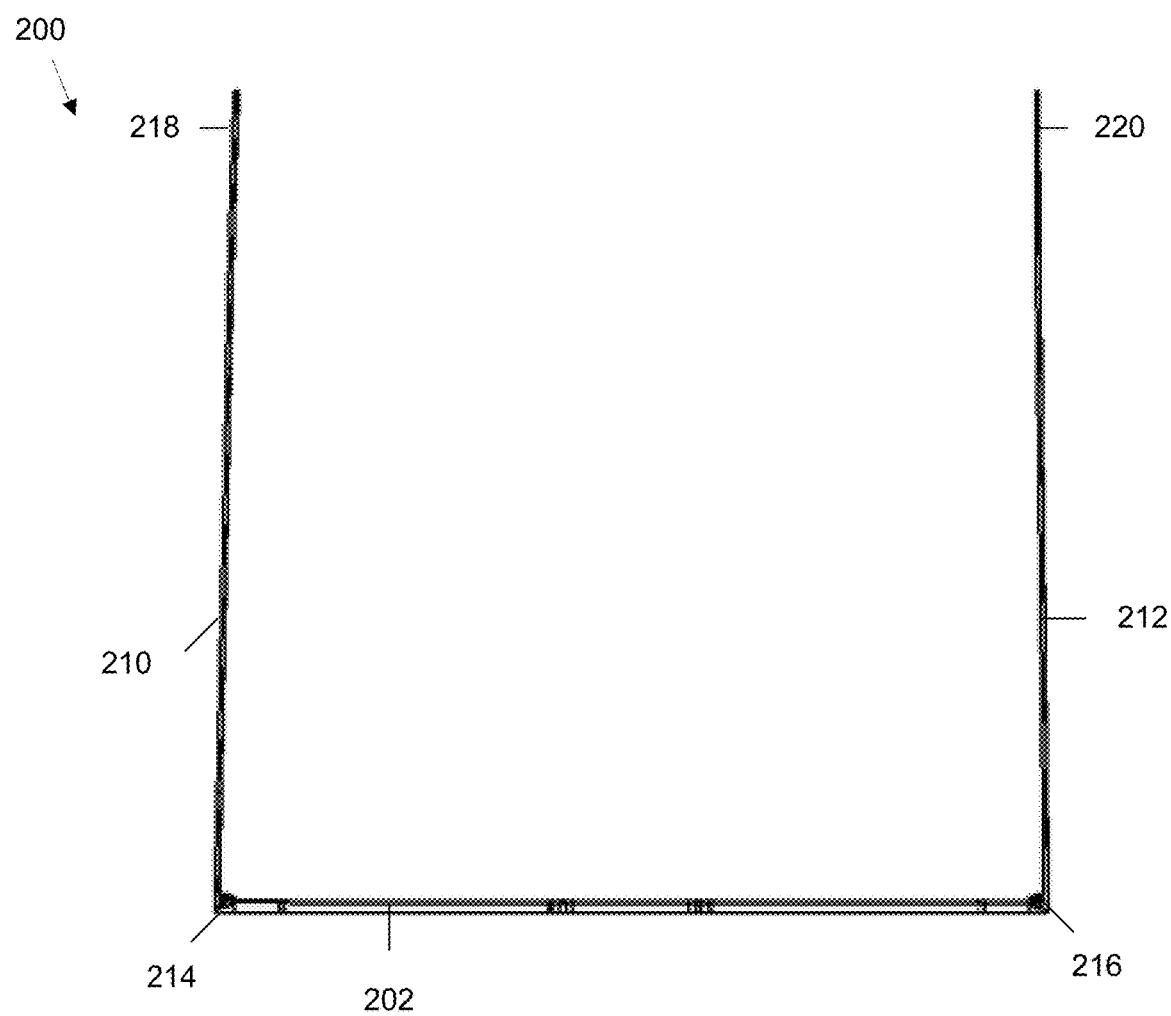
Figure 2D:
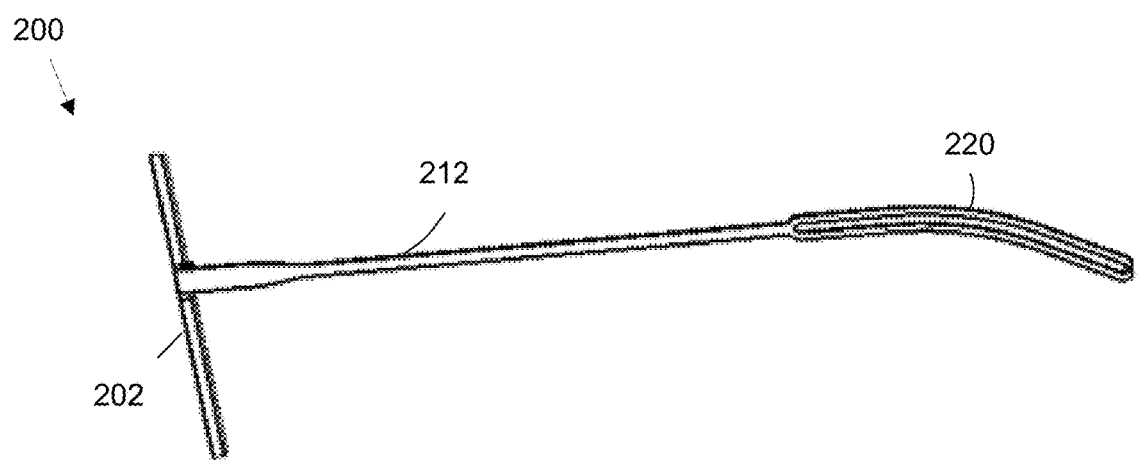
Figure 2E:
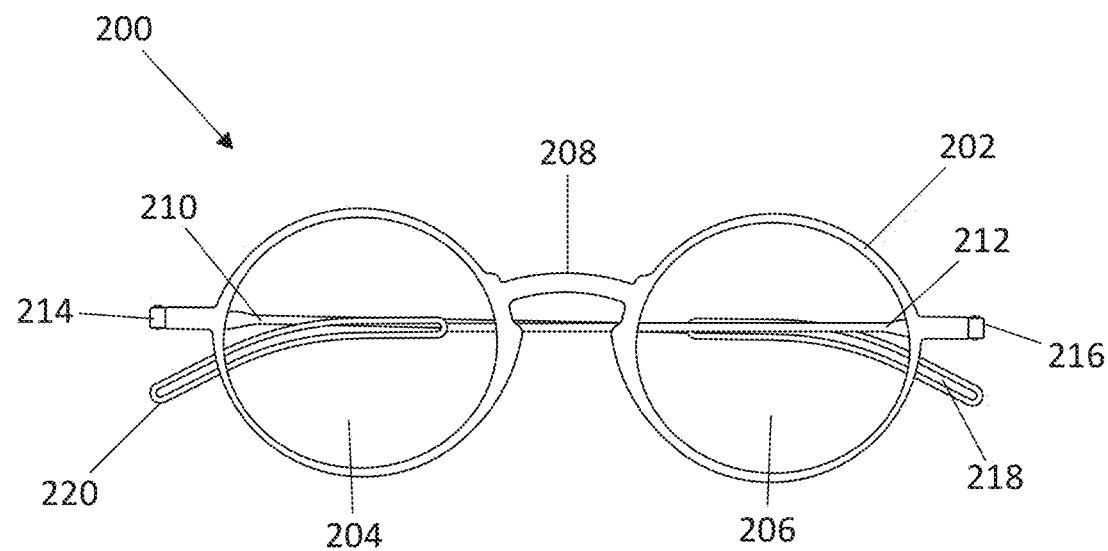
Figure 2F:
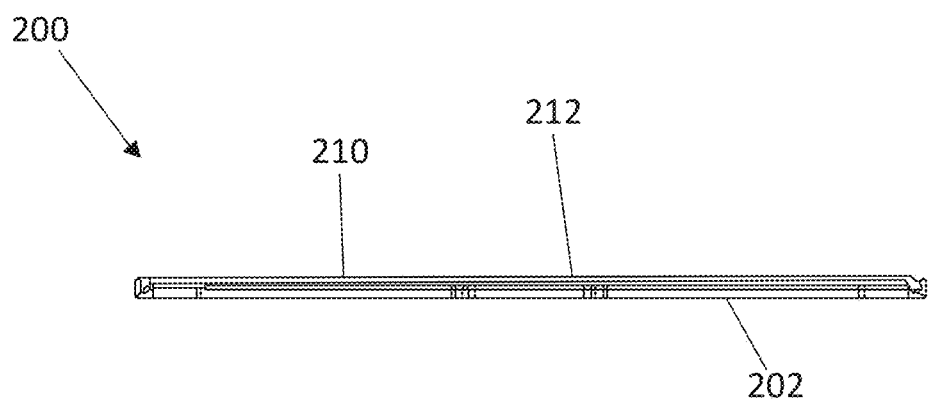

FIGS. 2E and 2F depict the glasses 200 in a folded configuration. The front view of FIG. 2E shows the glasses 200 comprising frame 202, lenses 204, 206, and bridge 208. Temple pieces 210, 212 are folded against the frame 202 and lenses 204, 206. The hinges 214, 216 connect the temple pieces 210, 213 to the frame 202. Temple tips 218, 220 are visible, angling down from the temple pieces. FIG. 2F provides a top view of the glasses 200 in a folded configuration, highlighting the thin profile of the glasses.

As shown in the top views of FIGS. 1C, 2C, and 2F the components of the glasses 100 can comprise a very thin profile. A thickness of the frame can be about 2 mm. Other thicknesses are also possible (e.g., about 1.5-3.5 mm, about 1.75-2.25 mm, about 1.8-2.2 mm, about 1.9-2.1 mm, about 1-3 mm, about 2-4 mm, etc.). A thickness of the temple pieces can be about 0.6 mm. Other thicknesses are also possible (e.g., about 0.5-0.7 mm, about 0.4-0.8 mm, about 0.3-0.9 mm, about 0.5-1.0 mm, etc.). In some embodiments, the thickness of the glasses in the folded configuration, with the temple pieces folded down over the lenses, is about 3.2 mm. Other thicknesses are also possible (e.g., less than about 3.5 mm, about 3-3.5 mm, about 3-4 mm, about 3.25-3.75 mm, about 3-3.4 mm, etc.).

In some embodiments, the thickness of the glasses in the folded configuration is about 2.6 mm. For example, the frame can have a thickness of about 2 mm. The temple pieces can have a thickness of about 0.6 mm each. In embodiments in which they do not overlap when in the folded configuration, the thickness of the overall pair of glasses is about 2.6 mm. In embodiments with the same dimension components, but where the temple pieces do overlap when in the folded configuration, the thickness of the glasses is about 3.2 mm.

In some embodiments, a volume of the glasses (e.g., glasses 100) in the folded configuration is no more than about 5 cm$^3$ (e.g., about 4.9 cm$^3$). Other volumes are also possible (e.g., about 4.9 cm$^3$, about 4-5 cm$^3$, about 4-6 cm$^3$, about 4 cm$^3$, about 6 cm$^3$, etc.). In some embodiments, a surface area of the glasses (e.g., glasses 100) is about 95.5 cm$^2$ (e.g., about 94.45 cm$^2$). Other surface areas are also possible (e.g., about 90-100 cm$^2$, about 80-100 cm$^2$, about 90-110 cm$^2$, etc.). In some embodiments a mass of the glasses (e.g., glasses 100) is about 7.9 g (e.g., about 7.87 g). Other masses are also possible (e.g., about 7 g, about 8 g, about 7-8 g, about 7-9 g, about 7-10 g, etc.) In some embodiments, the volume of the glasses in the folded configuration is no more than about 6 cm$^3$ (e.g., about 5.75 cm$^3$). Other volumes are also possible (e.g., about 5.5 cm$^3$, about 6 cm$^3$, about 5-6 cm$^3$, about 5-7 cm$^3$, about 4-7 cm$^3$, about 5-8 cm$^3$, about 4-6 cm$^3$, about 3-5 cm$^3$, greater than 7 cm$^3$, etc.). In some embodiments, a surface area of the glasses (e.g., glasses 200) is about 109 cm$^2$ (e.g., about 108.65 cm$^2$). Other surface areas are also possible (e.g., about 110 cm$^2$, about 100-110 cm$^2$ about 100-120 cm$^2$, about 90-110 cm$^2$, about 90-120 cm$^2$, about 80-120 cm$^2$, greater than 120 cm$^2$, about 70-100 cm$^2$, etc.). In some embodiments a mass of the glasses (e.g., glasses 200) is about 8.9 g (e.g., about 8.895 g). Other masses are also possible (e.g., about 8 g, about 9 g, about 8-10 g, about 7-10 g, about 8-11 g, etc.)

In some embodiments, a weight of the glasses is less than about 10 g. For example, in some embodiments, the glasses weight about 9.8 g. Other weights are also possible (e.g., 8-10 g, 7-10 g, about 7 g, about 8 g, about 9 g, about 10 g, greater than 10 g, etc.). Such a light weight can make the glasses very convenient to carry, for example, on a smartphone, in a purse, or on a pocket. Additionally, the light weight can make the glasses very comfortable for a user.

In some embodiments, the glasses disclosed herein can comprise one or both aspherical lenses. Aspherical lenses of high index material can provide advantageously provide substantial vision correction while still maintaining a thin profile. In some embodiments, the high index material comprises an index of refraction of about 1.5-1.75 (e.g., about 1.53-1.74, about 1.5-1.8, about 1.4-1.8, about 1.4-1.75, etc.). In some embodiments, the aspherical lens comprises multiple powers, for example, for near reading at the bottom, intermediate reading, such as a computer screen, in a section above the near reading zone, and a distance zone with no refraction for looking straight ahead into the distance. Aspherical lenses can comprise a thicker section in a central portion of the lens and thin out towards the edges of the lens. The thinning out can present a problem, as the lens can become too thin towards the edges to provide a good connection to the frame of the glasses. The inventors of the current application discovered that adding additional material to the edges of the frame can advantageously strengthen the connection between the lens and the frame while still maintaining a desirable optical environment for a user of the glasses. This material is separate from the material forming the high index, aspherical lens and does not provide vision correction. It can comprise a transparent material added to provide stability to the lens and frame.

Figure 4A:
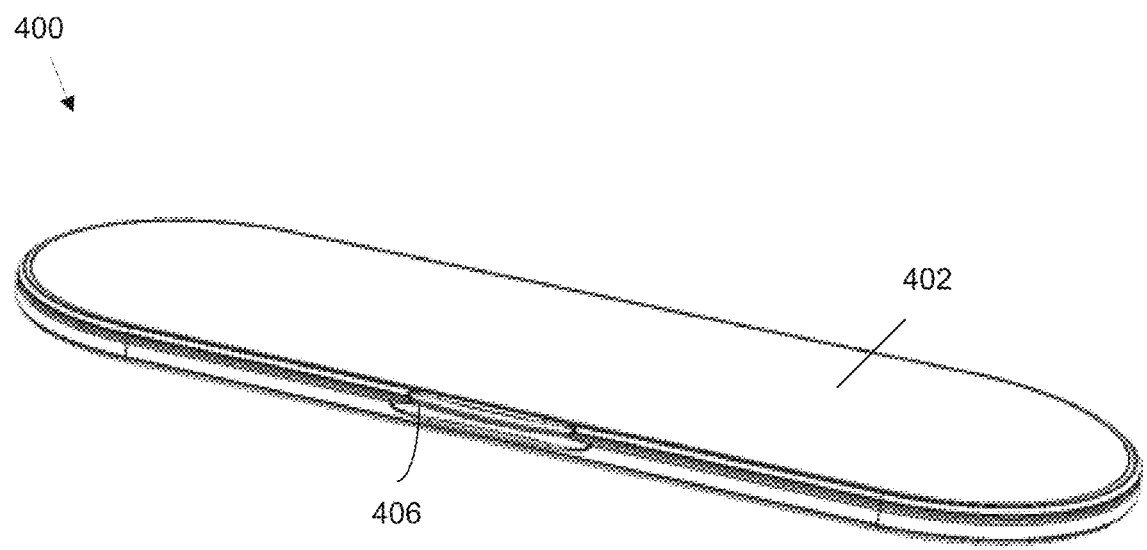
FIGS. 4A-4D illustrate an embodiment of a case for the eyeglasses disclosed herein.

The thin profile of the glasses can allow the glasses to be placed into a very thin, easy to carry case, an embodiment of which is shown in FIGS. 4A-4E. FIG. 4A illustrates a top perspective view of the case 400. The case 400 comprises a top portion 402 and a bottom portion 404 shown in the bottom perspective view of FIG. 4E. The top portion 402 and bottom portion 404 are hinged together to open as shown in FIGS. 5A and 5B. A latch 406 can be used to hold the case in a closed position.

Figure 4B:
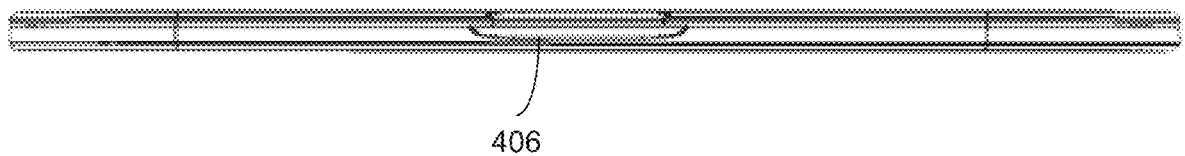
Figure 4C:
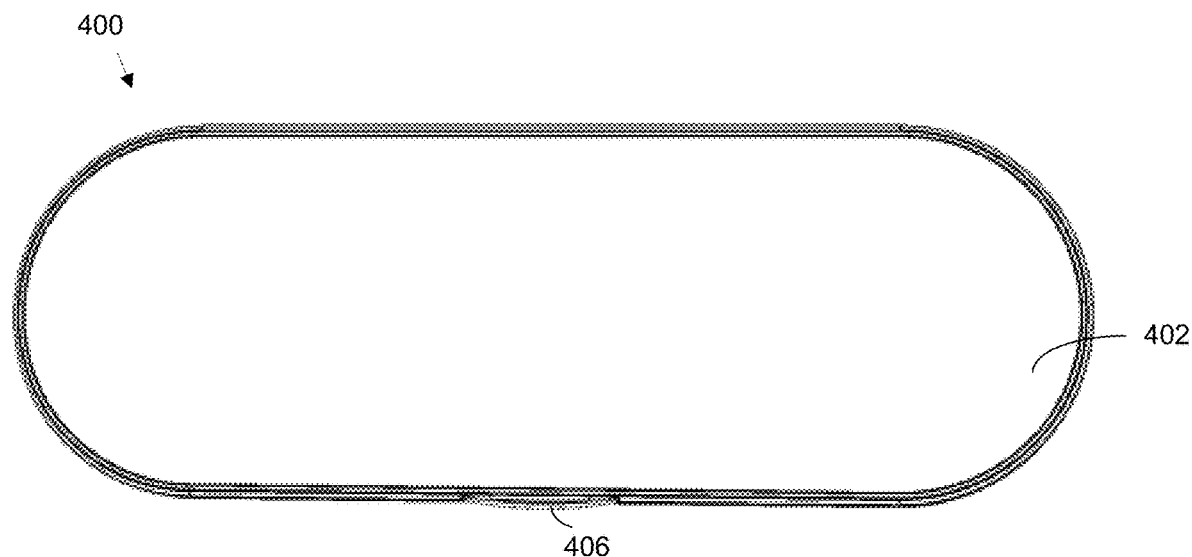
Figure 4D:
Figure 5A:
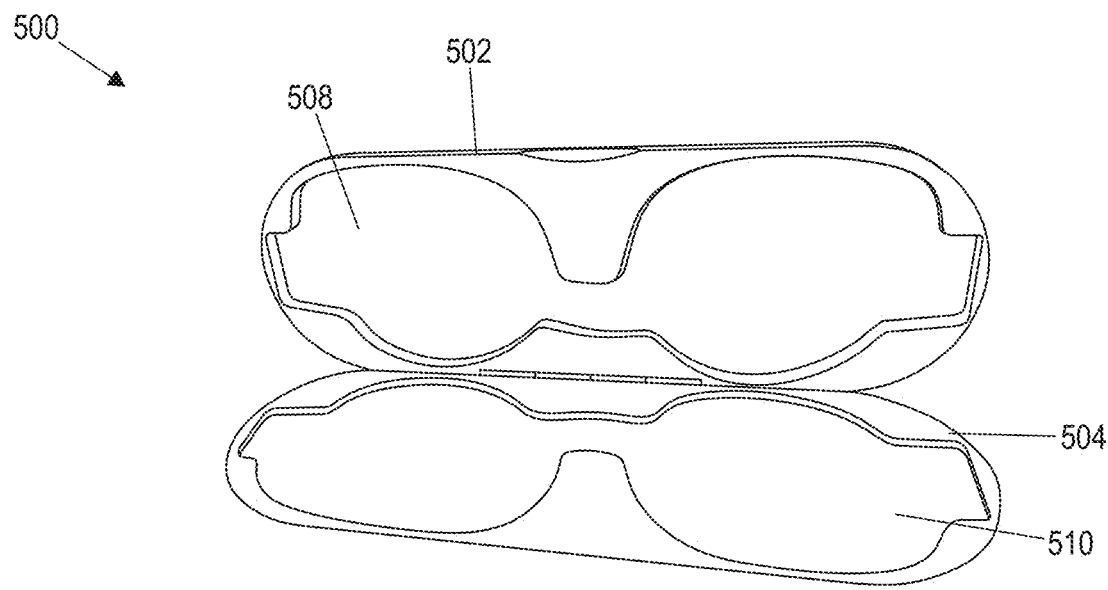
FIGS. 5A-5B show an embodiment of a case and eyeglasses positioned within the case.
Figure 5B:
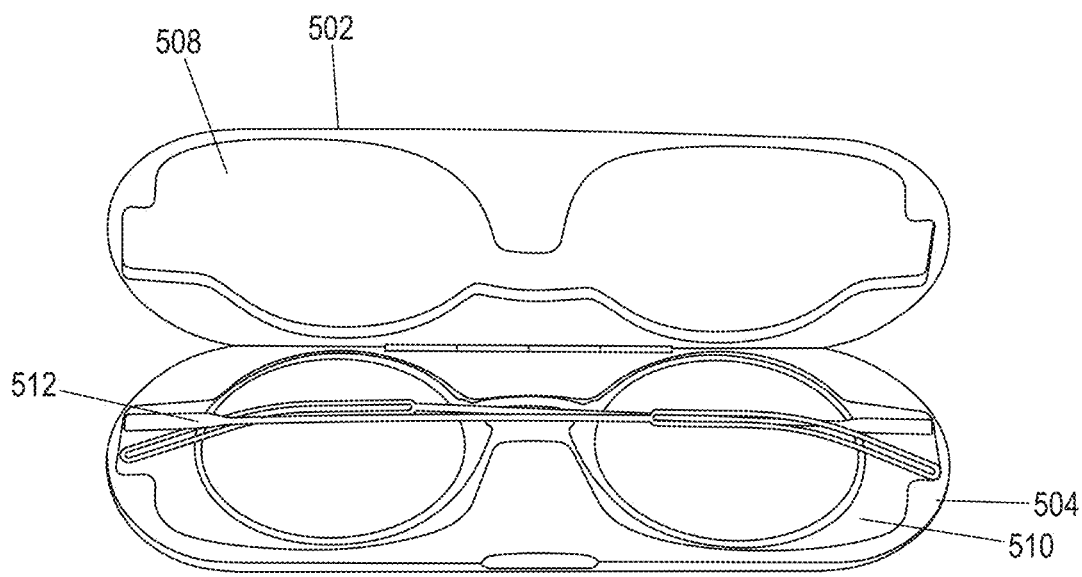

The case 400 comprises a very thin profile, shown in the front view of FIG. 4B and the side view of FIG. 4D. In some embodiments, a thickness of the case is about 4.5 mm. Other thicknesses are also possible (e.g., 4.35-4.5 mm, 4.25-4.75 mm, 4.2-4.7 mm, 4-4.5 mm, 3-5 mm, 3-6 mm, 2-5 mm, 3 mm, 3.2 mm, 3.5 mm, etc.).

The top and bottom portions can have an ovular shape, as shown in FIGS. 4A-4E. Other shapes are also possible (e.g., rectangular). In some embodiments, the case can be configured to attach to the back of a smartphone (e.g., using double-sided tape, Velcro, sliding groove, snaps, etc.). The thin profile of the case can advantageously add minimal thickness to a smartphone, allowing a user to carry the glasses case easily with other every day items. The case can comprise Brushed Aluminum with anodized treatment or stainless steel with appropriate coating and a polycarbonate/ABS core.

FIG. 5A shows an embodiment of a case 500 in an open configuration with the top portion 502 and the bottom portion 504 separated. As shown, the inside of the top portion 502 and the bottom portion 504 comprise depressions 508, 510 shaped to receive glasses 512 (FIG. 5B) such as those disclosed herein in a folded configuration. The depressions that are shaped to match the glasses can provide protection for the glasses, preventing them from being jostled within the case. Because of the thin profile of the glasses, the case can provide this protection while still maintaining a very low thickness (e.g., about 4.5 mm). As shown in FIG. 5B, there is extra room in the depressions, around the glasses 512. This shape of the depressions allows the case to carry various different styles of glasses, allowing manufacturing of only one case for various styles of glasses. In some embodiments, the material forming the depressions comprises Polycarbonate/ABS.

Figure 6A:
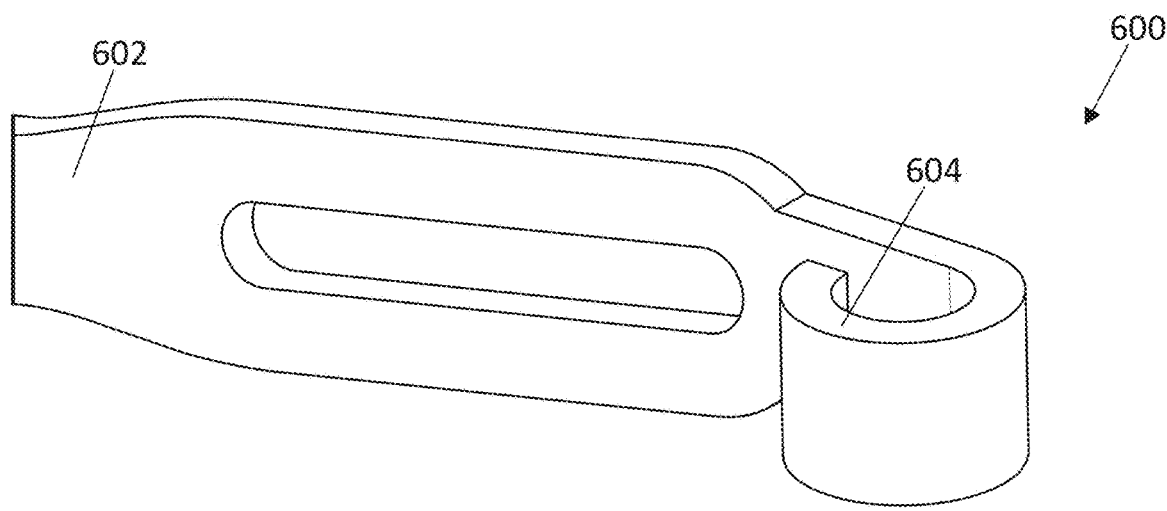
FIGS. 6A-6D depict an embodiment of a hinge.

FIGS. 6A-6D illustrate embodiments of a hinge that can be used with the glasses disclosed herein. As shown in FIG. 6A, the hinge 600 is formed from and at an end of the temple piece 602. The end of the temple piece is formed into a loop 604. A bearing (e.g., a low friction plastic bearing such as Delrin) can be inserted into the loop (not shown). The hinge assembly 600 is inserted into a pocket 620 (FIG. 6B) molded in the frame 622. A hole is drilled and a pin inserted through the frame and the bearing material to capture the temple piece and the bearing. The temple piece and hinge assembly can comprise a thin yet strong material (e.g., stainless steel). This hinge configuration allows all or most of the hinge to be within the plane of the glasses frame and lenses, which minimizes the overall thickness of the glasses. In this configuration, the total thickness of the glasses with a frame of 2 mm thickness and temple pieces with 0.6 mm thickness would be 2.6 mm substantially throughout the assembly except for the place where the temple pieces cross each other. In some embodiments, the temple pieces can be configured to not overlap in the folded configuration, and the thickness is 2.6 mm throughout the glasses.

Figure 6B:
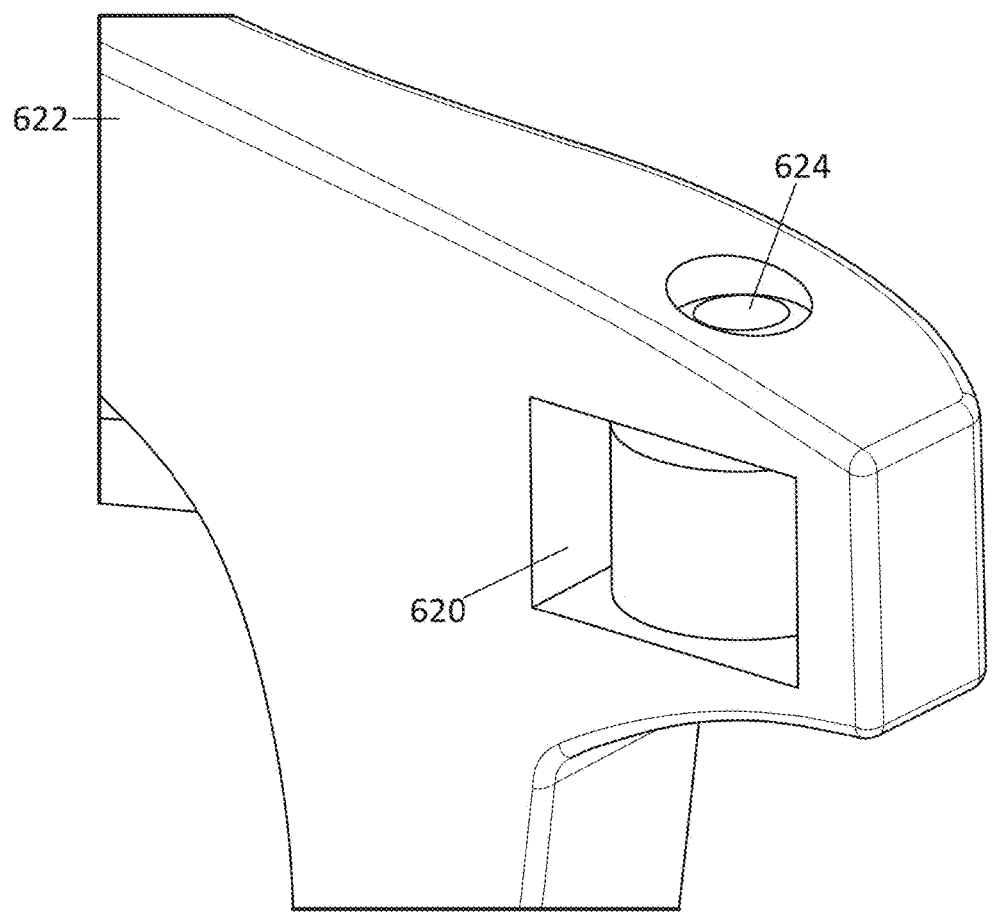
Figure 6C:
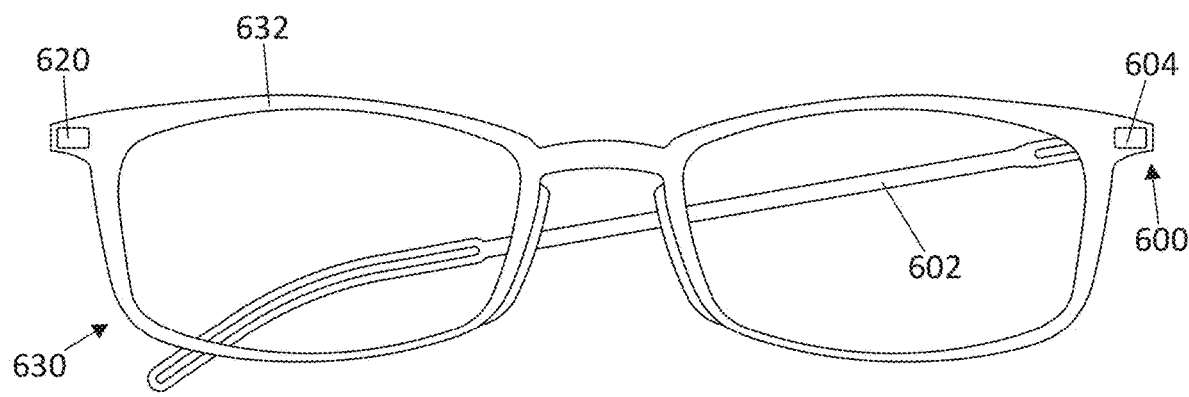
Figure 6D:
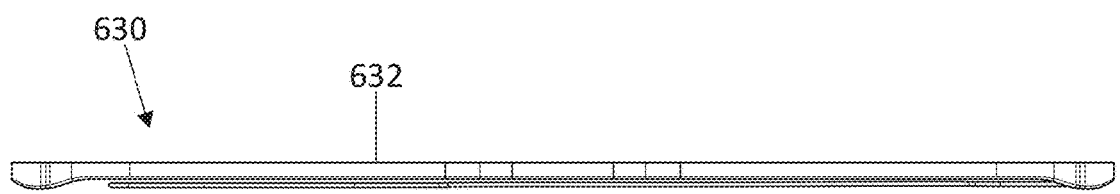

FIG. 6C illustrates a front view of an embodiment of eyeglasses 630 using the hinge assembly 600 of FIGS. 6A and 6B. Only one temple piece 602 is shown connected to the frame 632. Pocket 620 is shown on the other side of the frame 632. FIG. 6D shows a top view of the glasses 630 showing how flat the temple piece folds against the frame.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. Eyeglasses comprising
a frame defining a first plane having a first thickness extending between a first end of the frame to a second end of the frame, the frame comprising a nosebridge, a first pocket formed in the first end of the frame and a second pocket formed in the second end of the frame, wherein the nosebridge, the first pocket and the second pocket are within the first thickness of the frame;
a first lens and a second lens in communication with the frame;
a first temple piece extending from the first end of the frame and configured to fold down, the first temple piece configured to fold flat against the frame in a folded configuration, the first temple piece comprising a first loop formed at an end of the first temple piece, the first loop configured to be inserted into the first pocket on the frame; and
a second temple piece extending from the second end of the frame, the second temple piece configured to fold against the frame in a folded configuration, the second temple piece comprising a second loop formed at an end of the second temple piece, the second loop configured to be inserted into the second pocket on the frame, wherein the first thickness of the frame is about 2 mm and the thickness of the eyeglasses in the folded configuration is about 3.2 mm.

2. The eyeglasses of claim 1, further comprising a first pin inserted through the first pocket and the first loop; and a second pin configured to be inserted through the second pocket and the second loop.

3. The eyeglasses of claim 1, further comprising a first bearing configured to be inserted within the first loop; and a second bearing configured to be inserted into the second loop.

4. The eyeglasses of claim 1, wherein at least one of the first lens and the second lens is an aspherical lens comprising high index material.

5. The eyeglasses of claim 4, wherein additional lens material is added to an edge of the lens to extend the aspherical lens to the frame.

6. The eyeglasses of claim 1, wherein the frame comprises a rigid material.

7. An eyewear system comprising the eyeglasses of claim 1 and a case comprising a thickness of about 4.5 mm.

8. The eyeglasses of claim 1, wherein at least one of the first lens and the second lens comprises a high index, aspherical lens.

9. The eyeglasses of claim 1, wherein the frame comprises polycarbonate.

10. The eyeglasses of claim 1, wherein at least one of the first temple piece and the second temple piece comprises a metal.

11. The eyeglasses of claim 1, wherein at least one of the first temple piece and the second temple piece comprises nitinol.

12. Eyeglasses comprising
a frame defining a first plane having a first thickness extending between a first end of the frame to a second end of the frame, the frame comprising a nosebridge, a first pocket formed in the first end of the frame and a second pocket formed in the second end of the frame, wherein the nosebridge, the first pocket and the second pocket are within the first thickness of the frame;
a first lens and a second lens in communication with the frame;
a first temple piece extending from the first end of the frame and configured to fold down, the first temple piece configured to fold flat against the frame in a folded configuration, the first temple piece comprising a first loop formed at an end of the first temple piece, the first loop configured to be inserted into the first pocket on the frame; and
a second temple piece extending from the second end of the frame, the second temple piece configured to fold against the frame in a folded configuration, the second temple piece comprising a second loop formed at an end of the second temple piece, the second loop configured to be inserted into the second pocket on the frame, wherein the first temple piece and the second temple piece are configured to fold against the frame without overlap and wherein the thickness of the eyeglasses in the folded configuration is about 2.6 mm.

13. A method of manufacturing eyeglasses, comprising providing a frame defining a first plane having a first thickness extending between a first end of the frame and a second end of the frame; providing a first lens and a second lens in communication with the frame and separated by a fixed nosebridge;

providing a first temple piece extending from the first end of the frame and configured to fold down, the first temple piece configured to fold flat against the frame in a folded configuration;

providing a second temple piece extending from the second end of the frame, the second temple piece configured to fold against the frame in a folded configuration;

providing a first loop formed at an end of the first temple;

providing a second loop formed at an end of the second temple piece;

inserting a first pin through the first end of the frame and the first loop connecting the first temple piece to the first end of the frame; and inserting a second pin through the second end of the frame and the second loop connecting the second temple piece to the second end of the frame, wherein a thickness of the eyeglasses in the folded configuration is about 3.2 mm including the first thickness of the frame being about 2 mm.

14. The method of claim 13, further comprising UV printing the frame to apply a color or pattern.

15. The method of claim 13, further comprising plating at least one of the first and second temple pieces to apply a color or design.

16. The method of claim 13, further comprising applying soft touch paint to at least one of the first and second temple pieces to apply a color or design.

17. The method of claim 13, wherein at least one of the lenses is an aspherical lens comprising a high index material.

18. The method of claim 17, wherein providing the frame comprises adding additional material to an edge of the aspherical lens to extend it to reach the frame.

19. The method of claim 17, wherein providing the frame comprises adding additional material to an edge of the aspherical lens to thicken the edge of the aspherical lens.

* * * * *